(12) United States Patent
Sato et al.

(10) Patent No.: US 10,752,089 B2
(45) Date of Patent: Aug. 25, 2020

(54) AIR CONDITIONER

(71) Applicant: DENSO CORPORATION, Kariya, Aichi-pref. (JP)

(72) Inventors: Keigo Sato, Kariya (JP); Yoshiki Kato, Kariya (JP); Masayuki Takeuchi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 41 days.

(21) Appl. No.: 16/082,375

(22) PCT Filed: Feb. 13, 2017

(86) PCT No.: PCT/JP2017/005060
§ 371 (c)(1),
(2) Date: Sep. 5, 2018

(87) PCT Pub. No.: WO2017/154465
PCT Pub. Date: Sep. 14, 2017

(65) Prior Publication Data
US 2019/0084375 A1 Mar. 21, 2019

(30) Foreign Application Priority Data

Mar. 10, 2016 (JP) .................................. 2016-046796

(51) Int. Cl.
*B60H 1/22* (2006.01)
*B60H 1/00* (2006.01)
(Continued)

(52) U.S. Cl.
CPC .................. *B60H 1/22* (2013.01); *B60H 1/00* (2013.01); *B60H 1/32281* (2019.05);
(Continued)

(58) Field of Classification Search
CPC ...... B60H 1/2215; B60H 1/2225; B60H 1/22; B60H 1/0005; B60H 2001/00114;
(Continued)

(56) References Cited

U.S. PATENT DOCUMENTS 4,534,507 A 8/1985 Matsuda
5,678,761 A * 10/1997 Ikeda .................. B60H 1/00007
237/12.3 A
(Continued)

FOREIGN PATENT DOCUMENTS

JP S58142578 U 9/1983
JP H02192818 A 7/1990
(Continued)

*Primary Examiner* — Nelson J Nieves
(74) *Attorney, Agent, or Firm* — Harness, Dickey & Pierce, P.L.C.

(57) ABSTRACT

An air conditioner is provided with: a refrigeration cycle including a subcooling heat exchanger that subcools a refrigerant having heat-dissipated in a high-pressure side heat exchanger by exchanging heat with a heat medium; a blower that blows the air to an air passage in an air-conditioning casing; an air cooler disposed in the air passage to cool the air; a heater core disposed on an air flow downstream side of the air cooler in the air passage to heat the air cooled by the air cooler; an auxiliary air heater disposed on the air flow downstream side of the air cooler and on an air flow upstream side of the air heater in the air passage, to heat the air cooled by the air cooler by exchanging heat with the heat medium; and a flow-rate adjustment portion configured to adjust a flow rate of the heat medium circulating between the subcooling heat exchanger and the auxiliary air heater.

16 Claims, 9 Drawing Sheets

(51) Int. Cl.
*F25B 29/00* (2006.01)
*B60H 1/32* (2006.01)
*F28F 1/40* (2006.01)
*F28F 1/02* (2006.01)
*F28D 1/04* (2006.01)
*F25B 1/00* (2006.01)
*F25B 13/00* (2006.01)

(52) U.S. Cl.
CPC ............ *B60H 1/32284* (2019.05); *F25B 1/00* (2013.01); *F25B 13/00* (2013.01); *F25B 29/00* (2013.01); *F25B 29/003* (2013.01); *F28D 1/04* (2013.01); *F28F 1/02* (2013.01); *F28F 1/40* (2013.01)

(58) Field of Classification Search
CPC ............ B60H 1/00342; B60H 1/00885; B60H 2001/00928; B60H 2001/2265; F25B 1/00
See application file for complete search history.

(56) References Cited

U.S. PATENT DOCUMENTS

| | | | | |
|---|---|---|---|---|
| 5,971,289 | A * | 10/1999 | Kurahashi | B60H 1/00899 237/2 B |
| 8,371,512 | B2 * | 2/2013 | Douarre | B60H 1/039 237/2 B |
| 2004/0093880 | A1 * | 5/2004 | Zheng | B60H 1/3214 62/199 |
| 2005/0218135 | A1 * | 10/2005 | Kraemer | B60H 1/00364 219/202 |
| 2008/0041071 | A1 * | 2/2008 | Itoh | B60H 1/00342 62/79 |
| 2010/0122793 | A1 * | 5/2010 | Wolfe, IV | B60H 1/00321 165/58 |
| 2011/0146305 | A1 * | 6/2011 | Yahia | B60H 1/00921 62/79 |
| 2013/0206360 | A1 * | 8/2013 | Zhang | B60H 1/00278 165/42 |
| 2013/0291577 | A1 * | 11/2013 | Miyakoshi | B60H 1/00392 62/151 |
| 2014/0137595 | A1 * | 5/2014 | Seybold | B23P 15/26 62/498 |
| 2014/0305159 | A1 * | 10/2014 | Katoh | F28D 7/0008 62/515 |
| 2015/0059382 | A1 * | 3/2015 | Noda | F04B 39/06 62/238.6 |
| 2015/0217622 | A1 * | 8/2015 | Enomoto | B60H 1/00878 165/42 |
| 2015/0362268 | A1 * | 12/2015 | Maeda | G05D 23/1917 165/294 |
| 2016/0001634 | A1 * | 1/2016 | Terada | B60H 1/00921 62/160 |
| 2016/0010898 | A1 * | 1/2016 | Takeuchi | B60H 1/00278 62/498 |
| 2016/0016456 | A1 * | 1/2016 | Kang | F25B 5/04 165/42 |
| 2016/0059666 | A1 * | 3/2016 | Chen | F28F 9/00 62/238.7 |
| 2016/0137032 | A1 * | 5/2016 | Kuroda | B60H 1/08 165/104.32 |
| 2016/0185185 | A1 * | 6/2016 | Suzuki | B60H 1/00921 237/5 |
| 2016/0193896 | A1 * | 7/2016 | Miyakoshi | B60H 1/00385 62/155 |
| 2016/0201960 | A1 * | 7/2016 | Miyakoshi | B60H 1/00385 62/154 |
| 2016/0214461 | A1 * | 7/2016 | Kuroda | B60H 1/00885 |
| 2017/0054188 | A1 * | 2/2017 | Blatchley | H01M 10/663 |
| 2017/0182860 | A1 * | 6/2017 | Miyakoshi | B60H 1/00 |
| 2017/0197490 | A1 * | 7/2017 | Enomoto | B60H 1/00899 |
| 2017/0326945 | A1 * | 11/2017 | Hatakeyama | B60H 1/00385 |
| 2017/0349030 | A1 * | 12/2017 | Miura | B60K 11/02 |
| 2018/0003447 | A1 * | 1/2018 | Mougnier | F28D 7/1684 |
| 2018/0126820 | A1 * | 5/2018 | Makimoto | B60H 1/00028 |
| 2018/0201098 | A1 * | 7/2018 | Katoh | B60H 1/00328 |
| 2018/0222287 | A1 * | 8/2018 | Mieda | B60H 1/00914 |
| 2019/0248209 | A1 * | 8/2019 | Ishizeki | B60H 1/00978 |
| 2019/0353407 | A1 * | 11/2019 | Miyakoshi | B60H 1/22 |

FOREIGN PATENT DOCUMENTS

| | | |
|---|---|---|
| JP | 2014069639 A | 4/2014 |
| JP | 2015009652 A | 1/2015 |
| JP | 2015128926 A | 7/2015 |
| WO | WO-2016042699 A1 | 3/2016 |

* cited by examiner

AIR CONDITIONER

CROSS REFERENCE TO RELATED APPLICATION

This application is a U.S. National Phase Application under 35 U.S.C. 371 of International Application No. PCT/JP2017/005060 filed on Feb. 13, 2017 and published in Japanese as WO/2017/154465 A1 on Sep. 14, 2017. This application is based on and claims the benefit of priority from Japanese Patent Application No. 2016-046796 filed on Mar. 10, 2016. The entire disclosures of all of the above applications are incorporated herein by reference.

FIELD OF THE INVENTION

The present disclosure relates to an air conditioner that performs air-conditioning of a space to be air-conditioned.

BACKGROUND ART

Conventionally, for example, Patent Document 1 describes an air conditioner for a vehicle that cools air using an evaporator provided in an air-conditioning duct and heats the air flowing out of the evaporator using a heater core provided on an air flow downstream side of the evaporator, thereby adjusting the temperature of conditioned air.

In the related art, a refrigeration cycle device includes a compressor, a condenser, a subcooling heat exchanger, a decompression device, and an evaporator. The condenser condenses and liquefies the refrigerant discharged from the compressor by exchanging heat with the outside air. The subcooling heat exchanger further cools the liquid-phase refrigerant condensed in the condenser. The evaporator evaporates and vaporizes the refrigerant decompressed by the decompression device.

The subcooling heat exchanger is disposed at a position on the air flow downstream side with respect to the evaporator and on the air flow upstream side with respect to a heater core in the air-conditioning duct. The heater core allows the coolant for cooling the engine to flow therethrough.

RELATED ART DOCUMENT

[Patent Document]
[Patent Document 1] Japanese Unexamined Patent Application Publication No. 2015-009652

SUMMARY OF INVENTION

In the above-mentioned related art, the air cooled in the evaporator is reheated by both the subcooling heat exchanger and the heater core. Consequently, the amount of heat required for the heater core to heat the air can be reduced, as compared to when the air cooled in the evaporator is reheated only by the heater core.

However, according to studies conducted by the inventors of the present disclosure, in the above-mentioned related art, the flow rate of the refrigerant flowing through the subcooling heat exchanger is determined depending on the rotational speed of the compressor. In general, the rotational speed of the compressor is determined depending on a target temperature or the like of the evaporator. Through this, the flow rate of the refrigerant flowing through the subcooling heat exchanger is determined, regardless of the amount of heat required for heating the air in the subcooling heat exchanger. Thus, the amount of heat used to heat the air in the subcooling heat exchanger cannot be appropriately controlled.

In view of the foregoing matter, it is an object of the present disclosure to provide an air conditioner which can appropriately heat the air to be blown into the vehicle interior by using the heat exchanged in a subcooling heat exchanger.

An air conditioner according to an aspect of the present disclosure includes:

a refrigeration cycle including a compressor that draws and discharges a refrigerant, a high-pressure side heat exchanger that dissipates heat from the refrigerant discharged from the compressor, and a subcooling heat exchanger that exchanges heat between the refrigerant having heat-dissipated in the high-pressure side heat exchanger and a heat medium to subcool the refrigerant having heat-dissipated in the high-pressure side heat exchanger;

an air-conditioning casing defining an air passage through which air to be blown into a space to be air-conditioned flows;

a blower configured to blow the air to the air passage;

an air cooler disposed in the air passage to cool the air;

an air heater disposed on an air flow downstream side of the air cooler in the air passage, to heat the air cooled by the air cooler;

an auxiliary air heater disposed on an air flow downstream side of the air cooler and on an air flow upstream side of the air heater in the air passage, to heat the air cooled by the air cooler by exchanging heat with the heat medium; and a flow-rate adjustment portion configured to adjust a flow rate of the heat medium circulating between the subcooling heat exchanger and the auxiliary air heater.

Thus, the auxiliary air heater can heat the air to be blown into the vehicle interior by using the heat exchanged in the subcooling heat exchanger. The flow-rate adjustment portion adjusts the flow rate of the heat medium circulating between the subcooling heat exchanger and the auxiliary air heater, thereby making it possible to appropriately heat the air to be blown into the vehicle interior, in the auxiliary air heater.

DESCRIPTION OF EMBODIMENTS

Hereinafter, embodiments will be described with reference to the accompanying drawings. In the respective embodiments below, the same or equivalent parts are indicated by the same reference characters throughout the drawings.

First Embodiment

Figure 1:
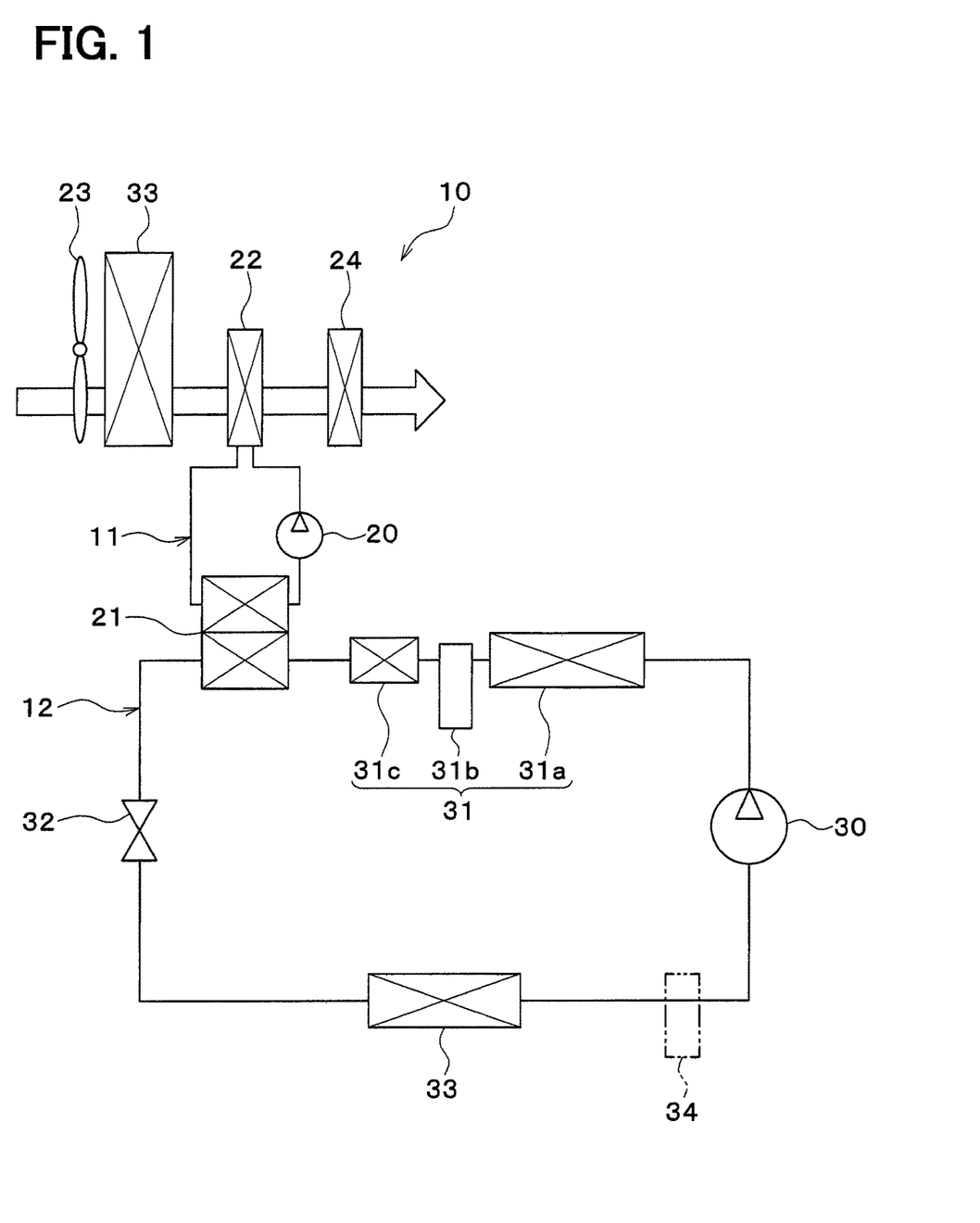
FIG. 1 is an entire configuration diagram showing an air conditioner for a vehicle in a first embodiment.

A vehicle air conditioner 10 shown in FIG. 1 is used to adjust the vehicle interior, which is a space to be air-conditioned, to an appropriate temperature. The vehicle air conditioner 10 includes a coolant circuit 11 and a refrigeration cycle 12. A coolant circulates in the coolant circuit 11. The refrigeration cycle 12 is a vapor-compression refrigeration system.

The coolant is a fluid serving as the heat medium. For example, the coolant is either a liquid containing at least ethylene glycol, dimethylpolysiloxane or a nanofluid, or an antifreezing fluid. The coolant circuit 11 is a heat-medium circuit through which the heat medium circulates. The heat transfer rate of the coolant is much higher than the heat transfer rate of the air.

The coolant circuit 11 includes a pump 20, a subcooling heat exchanger 21, and an auxiliary air heater 22. The pump 20 is an electric pump that draws and discharges the coolant. The pump 20 may be a belt-driven pump that is driven by the driving force of the engine transferred thereto via a belt.

The subcooling heat exchanger 21 is a coolant heater that heats the coolant by absorbing heat from the refrigerant in the refrigeration cycle 12. The auxiliary air heater 22 is an air heater that heats air to be blown into the vehicle interior by exchanging heat between the coolant heated by the subcooling heat exchanger 21 and the air blown by an interior blower 23.

The pump 20, the subcooling heat exchanger 21, and the auxiliary air heater 22 are arranged in series with one another in the coolant circuit 11.

The refrigeration cycle 12 includes a compressor 30, a condenser 31, the subcooling heat exchanger 21, an expansion valve 32, and an evaporator 33. The refrigerant in the refrigeration cycle 12 is a fluorocarbon refrigerant. The refrigeration cycle 12 is a subcritical refrigeration cycle in which a high-pressure side refrigerant pressure does not exceed the critical pressure of the refrigerant.

The compressor 30 is an electric compressor driven by power supplied from the battery. The compressor 30 draws, compresses, and discharges the refrigerant in the refrigeration cycle 12. The compressor 30 may be a belt-driven compressor that is driven by a driving force of the engine via an engine belt.

The condenser 31 is a high-pressure side heat exchanger that condenses a high-pressure refrigerant discharged from the compressor 30 by exchanging heat between the high-pressure refrigerant and air outside a vehicle cabin (hereinafter referred to as outside air). The condenser 31 may condense the high-pressure refrigerant discharged from the compressor 30 by exchanging heat between the high-pressure refrigerant and the coolant.

The condenser 31 is a subcool condenser that has a condensing portion 31a, a liquid storage portion 31b, and a subcooling portion 31c. The condensing portion 31a condenses the high-pressure refrigerant, discharged from the compressor 30, by exchanging heat between the high-pressure refrigerant and the outside air. The liquid storage portion 31b is a gas-liquid separator that separates a gas-liquid two-phase refrigerant flowing out of the condensing portion 31a into a gas-phase refrigerant and a liquid-phase refrigerant, and then causes the separated liquid-phase refrigerant to flow to the side of the subcooling portion 31c. The subcooling portion 31c subcools the liquid-phase refrigerant flowing out of the liquid storage portion 31b by exchanging heat between the liquid-phase refrigerant and the outside air.

Thus, the refrigeration cycle 12 configures a receiver cycle. The refrigeration cycle 12 may configure an accumulator cycle. That is, instead of the liquid storage portion 31b and the subcooling portion 31c, a liquid reservoir 34 may be provided as indicated by an alternate long and two short dashes line in FIG. 1. The liquid reservoir 34 is a gas-liquid separator that separates a gas-liquid two-phase refrigerant flowing out of the evaporator 33 into a gas-phase refrigerant and a liquid-phase refrigerant, and then causes the separated gas-phase refrigerant to flow out toward the side of the compressor 30.

The subcooling heat exchanger 21 is a heat exchanger that exchanges heat between the liquid-phase refrigerant flowing out of the condenser 31 and the coolant in the coolant circuit 11, thereby subcooling the liquid-phase refrigerant. The heat transfer rate of the refrigerant flowing through the subcooling heat exchanger 21 is much smaller than the heat transfer rate of the coolant.

The expansion valve 32 is a decompression device that decompresses and expands the liquid-phase refrigerant flowing out of the subcooling heat exchanger 21. The expansion valve 32 is a thermal expansion valve having a thermo-sensitive portion that detects the superheat degree of the refrigerant on an outlet side of the evaporator 33 based on the temperature and pressure of the refrigerant on the outlet side of the evaporator 33. That is, the expansion valve 32 is a thermal expansion valve that adjusts a throttle passage area by a mechanical system such that the superheat degree of the refrigerant on the outlet side of the evaporator 33 is within a predetermined range. The expansion valve 32 may be an electric expansion valve that adjusts the throttle passage area by an electric mechanism.

The evaporator 33 is a low-pressure side heat exchanger that evaporates a low-pressure refrigerant by exchanging heat between the low-pressure refrigerant decompressed and expanded by the expansion valve 32 and the air to be blown into the vehicle interior. The evaporator 33 is an air cooler that cools the air to be blown into the vehicle interior.

Figure 2:
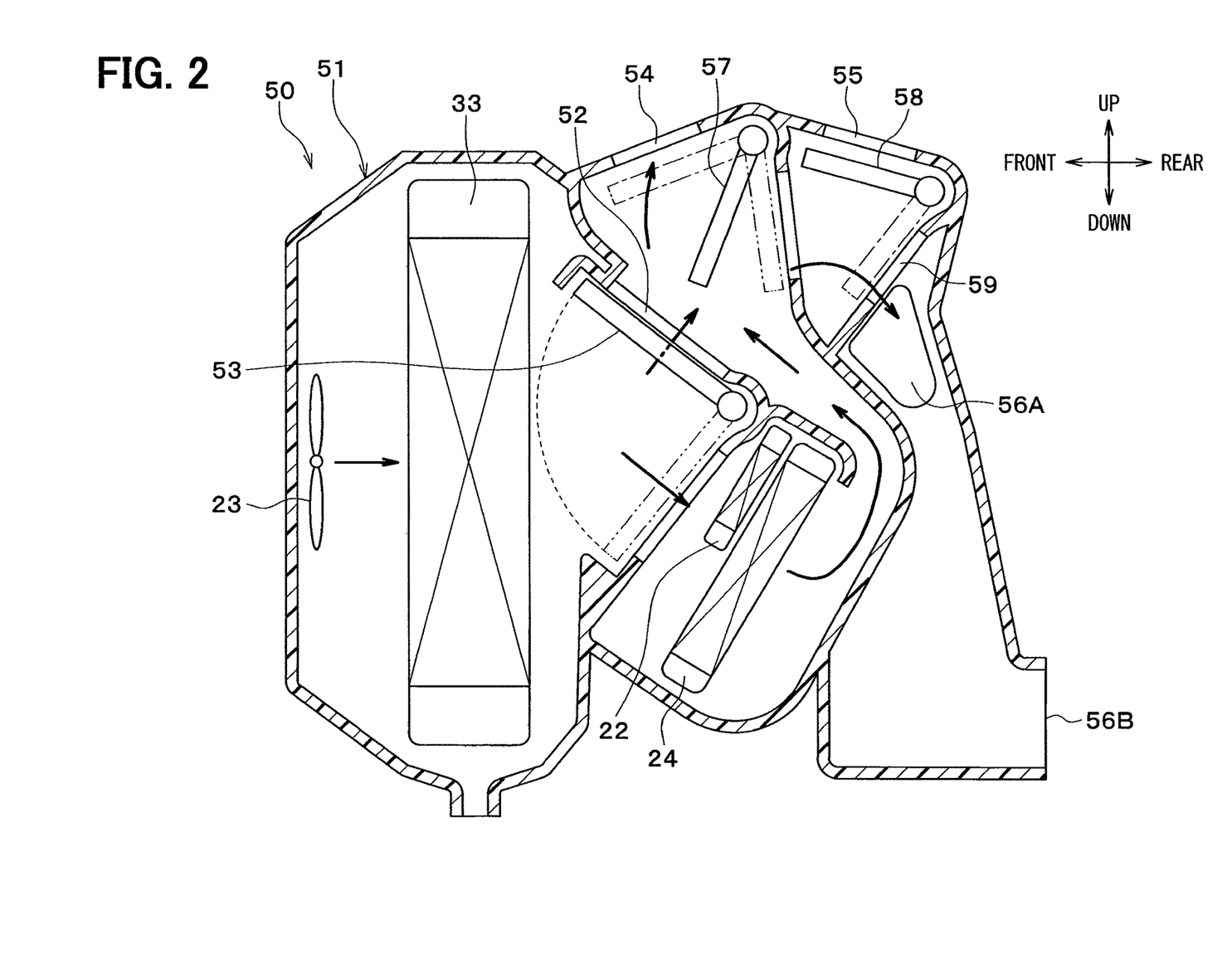
FIG. 2 is a cross-sectional view showing an interior air-conditioning unit in the first embodiment.

As shown in FIG. 2, the evaporator 33 and the auxiliary air heater 22 are accommodated in a casing 51 of an interior air-conditioning unit 50. The casing 51 has an air passage defined therein to allow the air to flow therethrough.

An inside/outside air switching box (not shown) and the interior blower 23 are disposed at the most upstream part of the air flow within the casing 51. FIG. 2 schematically shows the interior blower 23. The inside/outside air switching box is an inside/outside air switching portion that switches between the air in the vehicle cabin (hereinafter referred to as the inside air) and the outside air to introduce the selected one thereinto.

The interior blower 23 draws the air introduced by the inside/outside air switching portion and blows the air to an air passage in the casing 51. The evaporator 33, the auxiliary air heater 22, and a heater core 24 are disposed on the air flow downstream side of the interior blower 23 in the casing 51. The auxiliary air heater 22 and the heater core 24 are disposed on the air flow downstream side with respect to the evaporator 33. The heater core 24 is disposed on the air flow downstream side with respect to the auxiliary air heater 22.

The heater core 24 is an air-heating heat exchanger that heats air to be blown into the vehicle interior by exchanging heat between the air and an engine coolant for cooling the engine.

A cold-air bypass passage 52 is defined at the air flow downstream side of the evaporator 33 within the casing 51. The cold-air bypass passage 52 is a passage through which cold air having passed through the evaporator 33 flows bypassing the auxiliary air heater 22 and the heater core 24.

An air mix door 53 is disposed between the evaporator 33 and each of the auxiliary air heater 22 and heater core 24. The air mix door 53 is a flow-rate ratio adjustment portion that adjusts the ratio of the flow rate of cold air flowing into the auxiliary air heater 22 and the heater core 24 to the flow rate of cold air passing through the cold-air bypass passage 52 by regulating respective opening degrees of the cold-air bypass passage 52 and a ventilation passage on a side of the auxiliary air heater 22 and heater core 24.

The air mix door 53 is a rotary door that includes a rotary shaft rotatably supported relative to the casing 51 and a door board coupled to the rotary shaft.

Within the casing 51, the hot air having passed through the auxiliary air heater 22 and heater core 24 and the cold air having passed through the cold-air bypass passage 52 are mixed together to thereby adjust the temperature of conditioned air, which is to be blown into the interior space of the vehicle. Therefore, by regulating the opening-degree position of the air mix door 53, the temperature of the conditioned air can be adjusted to the desired temperature.

A defroster opening 54, a face opening 55, a foot opening 56A, and a rear foot opening 56B are formed in positions at the most downstream part of the air flow within the casing 51.

The defroster opening 54 is connected to a defroster air outlet (not shown) via a defroster duct (not shown). The defroster air outlet is disposed in the interior space of the vehicle. The conditioned air is blown from the defroster air outlet toward an inner surface of the vehicle window glass.

The face opening 55 is connected to a face air outlet (not shown) via a face duct (not shown). The face air outlet is disposed in the interior space of the vehicle. The conditioned air is blown from the face air outlet toward the upper body of an occupant.

The foot opening 56A is connected to a foot duct (not shown). The foot duct extends downward. The conditioned air is blown from a foot air outlet located at the tip end of the foot duct toward the feet of an occupant sitting on a front seat.

The rear foot opening 56B is connected to a rear foot duct (not shown). The rear foot duct extends toward the rear of the vehicle. The conditioned air is blown from a rear foot air outlet located at the tip end of the rear foot duct toward the feet of an occupant sitting on a rear seat.

The defroster opening 54 is opened and closed by a defroster door 57. The face opening 55, the foot opening 56A, and the rear foot opening 56B are opened and closed by a face and foot door 58.

The face and foot door 58 opens and closes a foot passage inlet 59, thereby opening and closing the foot opening 56A and the rear foot opening 56B. The foot passage inlet 59 is an inlet of an air passage that leads from the vicinity of the face opening 55 to the foot opening 56A and the rear foot opening 56B.

Each of the defroster door 57 and the face and foot door 58 is a rotary door that includes a rotary shaft rotatably supported relative to the casing 51 and a door board coupled to the rotary shaft.

Figure 3:
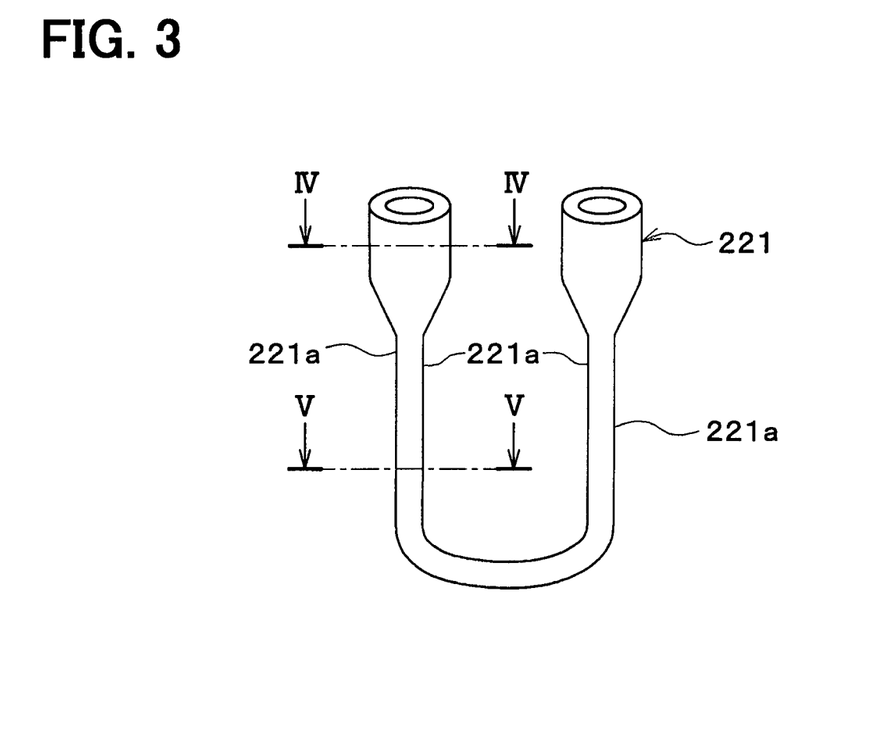
FIG. 3 is a perspective view showing a tube of an auxiliary air heater in the first embodiment.

As shown in FIG. 3, the auxiliary air heater 22 has a plurality of tubes 221 through which the coolant flows. The auxiliary air heater 22 exchanges heat between the coolant flowing through the inside of the plurality of tubes 221 and the air flowing through the outside of the tubes 221.

Figure 4:
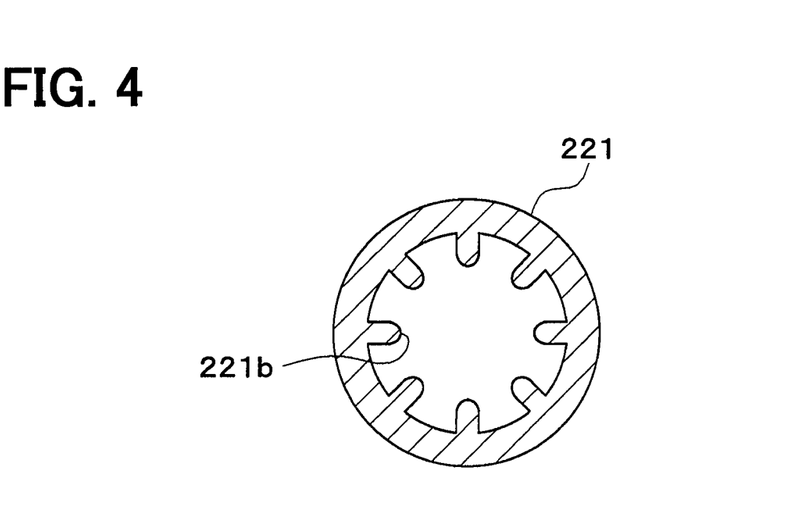
FIG. 4 is a cross-sectional view taken along the line IV-IV of FIG. 3.
Figure 5:
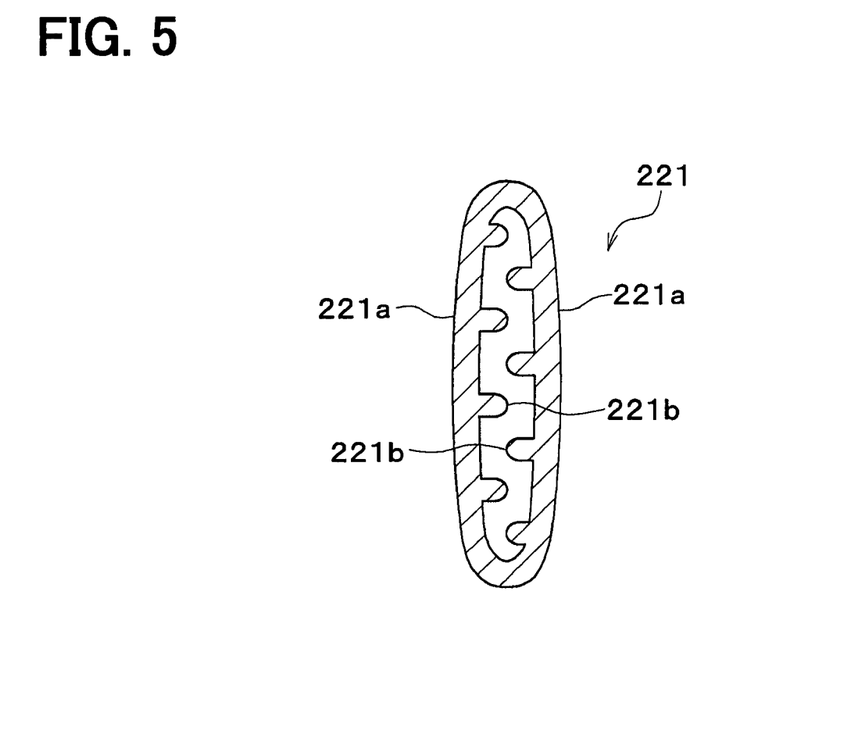
FIG. 5 is a cross-sectional view taken along the line V-V of FIG. 3.

As shown in FIG. 4, each of both end parts of the tube 221 has a perfectly circular cross-sectional shape. As shown in FIG. 5, a part between both end parts of the tube 221 has an oval shape. The part between both end parts of the tube 221 has flat, planar surfaces 221a.

Figure 6:
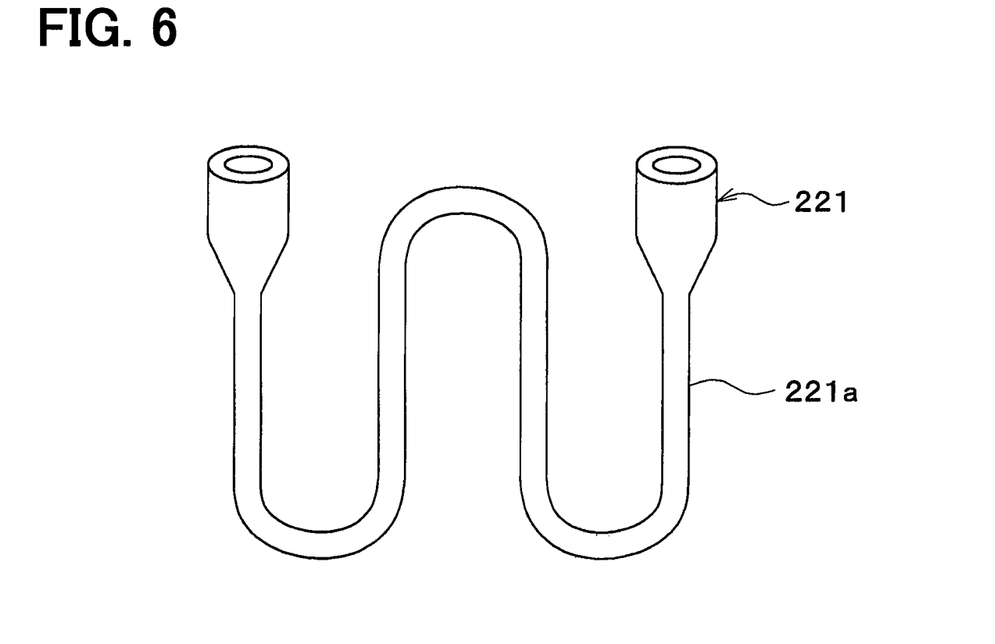
FIG. 6 is a perspective view showing a modification of the tube of the auxiliary air heater in the first embodiment.

As shown in FIG. 3, the part between both end parts of the tube 221 is bent such that the planar surfaces 221a face each other. In an example shown in FIG. 3, a bent part of the tube 221 is positioned at one site, but as shown in FIG. 6, bent parts of the tube 221 may be provided at a plurality of sites.

As shown in FIGS. 4 and 5, a number of protrusions 221b that protrude toward the inside of the tube 221 are formed at the inner peripheral surface of the tube 221.

Figure 7:
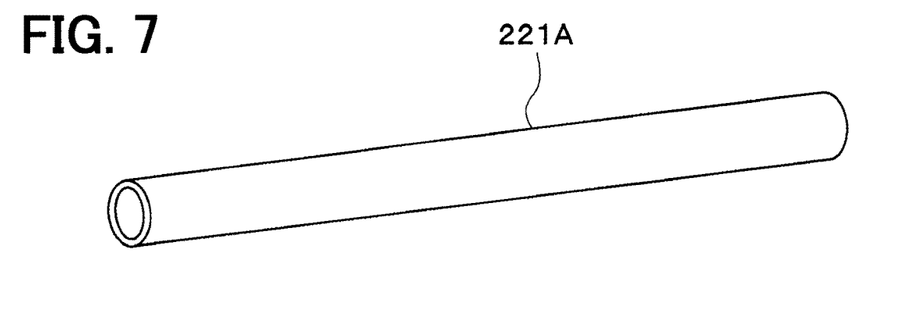
FIG. 7 is a perspective view showing a circular pipe member used when forming the tube of the auxiliary air heater in the first embodiment.

A formation method of the tube 221 will be described below. First, a circular pipe member 221A shown in FIG. 7 is prepared. The circular pipe member 221A has a perfectly circular cross-sectional shape. A number of protrusions 221b that protrude toward the inside of the circular pipe member 221A are formed in advance at the inner peripheral surface of the circular pipe member 221A.

Figure 8:
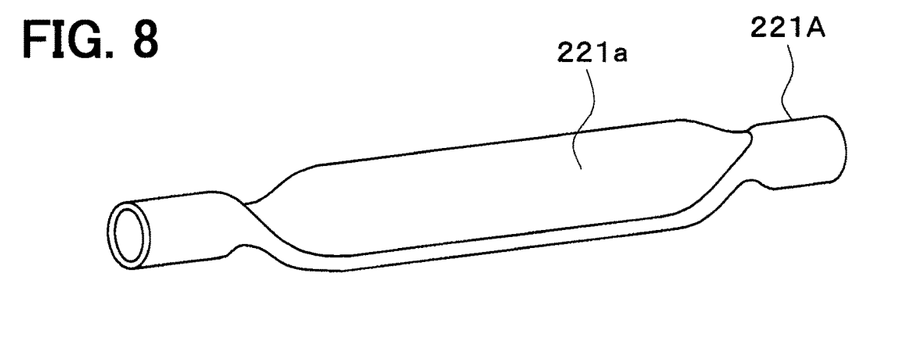
FIG. 8 is a perspective view showing the changed shape of the circular pipe member, shown in FIG. 7, in a working process.

Then, as shown in FIG. 8, a part other than both end parts of the circular pipe member 221A is pressed and flattened. Thus, the part other than both end parts of the circular pipe member 221A has an oval cross-sectional shape, and the flat, planar surfaces 221a are formed at the part other than both end parts of the circular pipe member 221A.

At this time, a number of protrusions 221b serves as support rods at the inner peripheral surface of the circular pipe member 221A, thereby making it possible to prevent the part other than both end parts of the circular pipe member 221A from being pressed excessively.

A part of the circular pipe member 221A with the planar surfaces 221a formed thereat is bent so that the planar surfaces 221a face each other to form the tube 221.

Figure 9:
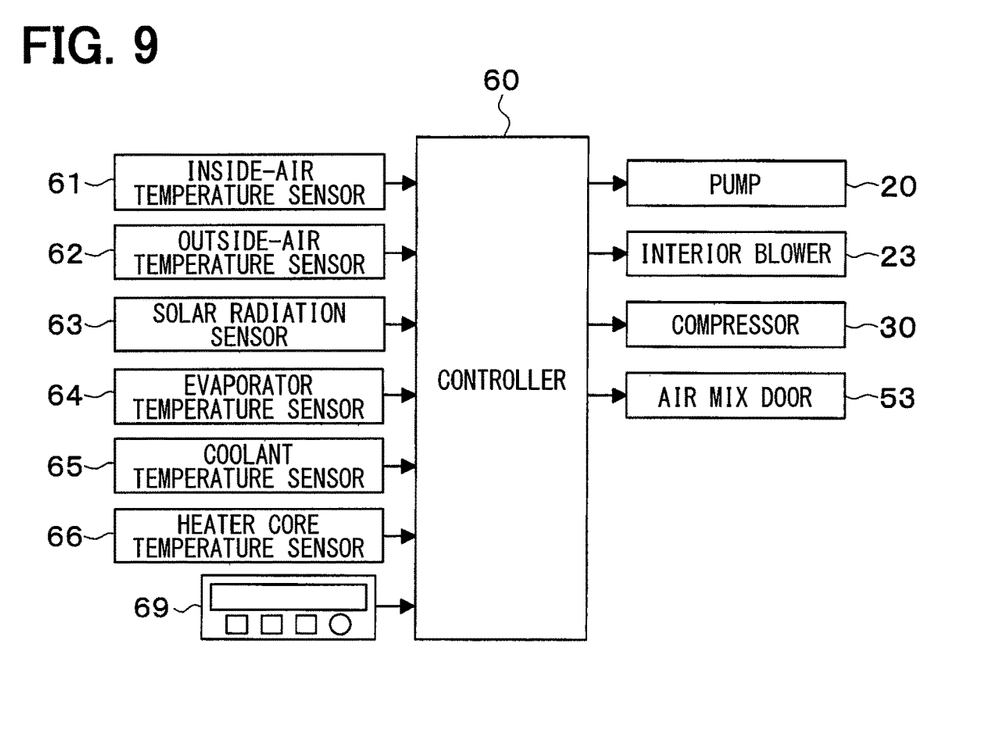
FIG. 9 is a block diagram showing an electric control unit of the air conditioner for a vehicle in the first embodiment.

Next, an electric control unit of the vehicle air conditioner 10 will be described with reference to FIG. 9. A controller 60 is configured of a known microcomputer, including a CPU, a ROM, a RAM, and the like, and a peripheral circuit thereof. The controller 60 performs various computations and processing based on control programs stored in the ROM. Various control target devices are connected to an output side of the controller 60. The controller 60 is a control unit that controls the operations of various control target devices.

The control target devices controlled by the controller 60 include the pump 20, the interior blower 23, the compressor 30, the air mix door 53 of the interior air-conditioning unit 50, and the like.

Detection signals from a group of sensors are input to the input side of the controller 60. The sensor group includes an inside-air temperature sensor 61, an outside-air temperature sensor 62, a solar radiation sensor 63, an evaporator temperature sensor 64, a coolant temperature sensor 65, a heater core temperature sensor 66, and the like.

The inside-air temperature sensor 61 is an inside-air temperature detecting portion that detects the temperature of the inside air. The outside-air temperature sensor 62 is an outside-air temperature detecting portion that detects the temperature of the outside air. The solar radiation sensor 63 is a solar radiation amount detecting portion that detects the amount of solar radiation received by the vehicle interior.

The evaporator temperature sensor 64 is an evaporator temperature detecting portion that detects the blown air temperature TE of the air blown from the evaporator 33. Specifically, the evaporator temperature sensor 64 is a fin thermistor that detects the temperature of a heat exchange fin in the evaporator 33. The evaporator temperature sensor 64 may be a coolant temperature sensor that detects the temperature of the refrigerant circulating through the evaporator 33.

The coolant temperature sensor 65 is a coolant temperature detecting portion that detects the temperature of the coolant flowing through the coolant circuit 11.

The heater core temperature sensor 66 is a heat exchanger temperature detecting portion that detects the temperature of the heater core 24. For example, the heater core temperature sensor 66 is a coolant temperature sensor that detects the temperature of the engine coolant flowing through the heater core 24. The heater core temperature sensor 66 may be a fin thermistor that detects the temperature of a heat exchange fin in the heater core 24.

The evaporator temperature sensor 64 is an evaporator temperature detecting portion that detects the blown air temperature TE (substantially, evaporator temperature) of the air blown from the evaporator 33. The coolant temperature sensor 65 is a coolant temperature detecting portion that detects the coolant temperature TW of the coolant flowing out of the engine EG. The heater core temperature sensor 66 is a heater core temperature detecting portion that detects the blown air temperature TH (substantially, heater core temperature) of the air blown from the heater core 24.

Specifically, the evaporator temperature sensor 64 detects the temperature of a heat exchange fin in the evaporator 33. The evaporator temperature sensor 64 may be a temperature detecting portion that detects the temperature of other parts of the evaporator 33. The evaporator temperature sensor 64 may be a temperature detecting portion that detects the temperature of the refrigerant circulating through the evaporator 33.

Specifically, the heater core temperature sensor 66 detects the temperature of the heat exchange fin in the heater core 24. The heater core temperature sensor 66 may be a temperature detecting portion that detects the temperature of other parts of the heater core 24. The heater core temperature sensor 66 may be a temperature detecting portion that detects the temperature of the coolant circulating through the heater core 24.

An operation panel 69 is provided with various air-conditioning operation switches. Operation signals from these operation switches are input to the input side of the controller 60. For example, the operation panel 69 is disposed near the dashboard at the front of the vehicle interior.

Various air-conditioning operation switches provided on the operation panel 69 include a vehicle-interior temperature setting switch, an automatic switch, an air-conditioner switch, an air-volume setting switch, an air-conditioning stop switch, and the like.

The vehicle-interior temperature setting switch is target temperature setting means for setting a target vehicle interior temperature Tset by an operation of an occupant. The automatic switch is a switch that sets or cancels automatic control of the air-conditioning. The air-conditioner switch is a switch that switches between operating and stopping of air-cooling or dehumidification. The air-volume setting switch is a switch that sets the volume of air blown from the interior blower. The air-conditioning stop switch is a switch that stops the air-conditioning.

Each switch may be of a push switch type that brings electric contacts into conduction by being mechanically pushed, or a touch screen type that reacts in response to contact with a predetermined region on an electrostatic panel.

The controller 60 determines an air-conditioning mode based on an outside air temperature and a target air outlet temperature TAO of the air blown into the vehicle interior. The target air outlet temperature TAO is a value determined so that the temperature of the inside air quickly approaches a target temperature Tset desired by the occupant and calculated by the following formula F1.

$$TAO = Kset \times Tset - Kr \times Tr - Kam \times Tam - Ks \times Ts + C \qquad \text{F1}$$

In this formula, Tset is a target temperature of the vehicle interior set by the vehicle-interior temperature setting switch, Tr is an inside air temperature detected by the inside-air temperature sensor 61, Tam is an outside air temperature detected by the outside-air temperature sensor 62, and Ts is a solar radiation amount detected by the solar radiation sensor 63. Kset, Kr, Kam, and Ks are control gains, and C is a constant for correction.

The controller 60 determines a target evaporator temperature TEO based on the target air outlet temperature TAO. The target evaporator temperature TEO is a target value of the refrigerant evaporation temperature in the evaporator 33. As the target air outlet temperature TAO increases, the target evaporator temperature TEO is increased.

The controller 60 determines the rotational speed of the compressor 30 such that the blown air temperature TE of the air blown from the evaporator 33 approaches the target evaporator temperature TEO. In this way, the refrigerant flow rate in the refrigeration cycle 12 is controlled.

Next, the operation of the above-mentioned configuration will be described. When the controller 60 operates the pump 20 and the compressor 30 while the engine is operating, the subcooling heat exchanger 21 subcools the liquid-phase refrigerant flowing out of the condenser 31, thereby making it possible to improve the cycle efficiency of the refrigeration cycle 12.

The subcooling heat exchanger 21 dissipates heat from the liquid-phase refrigerant into the coolant in the coolant circuit 11, so that the coolant in the coolant circuit 11 is heated. The auxiliary air heater 22 heats cold air having passed through the evaporator 33 by exchanging heat between the coolant heated by the subcooling heat exchanger 21 and the cold air having passed through the evaporator 33. Thus, the amount of heat required for the heater core 24 to reheat the cold air having passed through the evaporator 33 can be reduced.

The controller 60 controls the rotational speed of the pump 20 to adjust the flow rate of the coolant flowing through the subcooling heat exchanger 21 and the auxiliary air heater 22, thereby adjusting the heat exchange amounts in the subcooling heat exchanger 21 and the auxiliary air heater 22.

The flow rate of the coolant flowing through the subcooling heat exchanger 21 and the auxiliary air heater 22 is controlled independently of the flow rate of the refrigerant in the refrigeration cycle 12. Thus, the heat exchange amounts in the subcooling heat exchanger 21 and the auxiliary air heater 22 can be adjusted as appropriate, thereby appropriately heating the air to be blown into the vehicle interior, in the auxiliary air heater 22.

The heat transfer rate of the coolant in the auxiliary air heater 22 is very high, compared to the heat transfer rate of the refrigerant in the subcooling heat exchanger 21. Thus, in the auxiliary air heater 22, the air to be blown into the vehicle interior exchanges heat with the coolant having a very high heat transfer rate. Therefore, the auxiliary air heater 22 can secure the necessary heat exchange capability even though the body of the auxiliary air heater 22 is small, so that the body of the auxiliary air heater 22 can be reduced in size, thereby simplifying the structure of the interior air-conditioning unit 50.

In the present embodiment, the subcooling heat exchanger 21 subcools the refrigerant, from which heat is dissipated in the high-pressure side heat exchanger 31, by exchanging heat between the coolant and the refrigerant, from which the heat is dissipated in the high-pressure side heat exchanger 31. The auxiliary air heater 22 is disposed on the air flow downstream side of the evaporator 33 and on the air flow upstream side of the heater core 24 in the air passage of the air-conditioning casing 51. The pump 20 adjusts the flow rate of the coolant circulating between the subcooling heat exchanger 21 and the auxiliary air heater 22.

Thus, the auxiliary air heater 22 can heat the air to be blown into the vehicle interior by using the heat exchanged in the subcooling heat exchanger 21. The pump 20 adjusts the flow rate of the coolant circulating between the subcooling heat exchanger 21 and the auxiliary air heater 22, thereby making it possible to appropriately heat the air to be blown into the vehicle interior, in the auxiliary air heater 22.

As the heat transfer rate of the coolant is higher than the heat transfer rate of the refrigerant in the subcooling heat exchanger 21, the auxiliary air heater 22 can obtain the necessary heat exchange amount even when the body of the auxiliary air heater 22 is reduced in size. As the heat transfer rate of the coolant is higher than the heat transfer rate of the refrigerant in the subcooling heat exchanger 21, the auxiliary air heater 22 can obtain the necessary heat exchange amount even when the air passage of the auxiliary air heater 22 is enlarged in order to decrease a ventilation air resistance of the auxiliary air heater 22.

In the present embodiment, the controller 60 controls the operation of the pump 20 such that the flow rate of the coolant flowing through the auxiliary air heater 22 increases as the amount of heat required for heating the air cooled in the evaporator 33 increases.

Thus, when the amount of heat required for heating the air cooled in the evaporator 33 is large, the heat exchange amount in the auxiliary air heater 22 increases, thus making it possible to suppress an increase in the amount of heat for heating the air in the heater core 24.

The case where the amount of heat required for heating the air cooled in the evaporator 33 is large is, for example, a case where an air-heating load is high. The case where the air-heating load is high is, for example, a case where the target air outlet temperature TAO is high. The case where the target air outlet temperature TAO is high is, for example, a case where the outside air temperature is low.

When the outside air temperature is low, a dehumidification capability required of the evaporator 33 becomes low. Thus, the controller 60 decreases the rotational speed of the compressor 30 to thereby reduce the flow rate of the refrigerant in the refrigeration cycle 12. At this time, the efficiency of the refrigeration cycle 12 can be improved by increasing the heat exchange amount in the auxiliary air heater 22.

In the present embodiment, the controller 60 controls the operation of the pump 20 such that the flow rate of the coolant flowing through the auxiliary air heater 22 decreases as the amount of heat required for heating the air cooled in the evaporator 33 decreases.

Thus, when the amount of heat required for heating the air cooled in the evaporator 33 is small, the heat exchange amount in the auxiliary air heater 22 decreases, thereby making it possible to prevent the air cooled in the evaporator 33 from being excessively heated in the auxiliary air heater 22.

The case where the amount of heat required for heating the air cooled in the evaporator 33 is small is, for example, a case where an air-heating load is low. The case where the air-heating load is low is, for example, a case where the target air outlet temperature TAO is low. The case where the target air outlet temperature TAO is low is, for example, a case where the outside air temperature is high.

When the outside air temperature is high, a dehumidification capability required of the evaporator 33 becomes high. Thus, the controller 60 enhances the rotational speed of the compressor 30 to thereby increase the flow rate of the refrigerant in the refrigeration cycle 12. At this time, by decreasing the heat exchange amount in the auxiliary air heater 22, the air cooled in the evaporator 33 can be prevented from being excessively heated in the auxiliary air heater 22.

For example, during the maximum air-cooling, the air cooled in the evaporator 33 is excessively reheated by the auxiliary air heater 22 and thereby can be prevented from being at a temperature higher than the target air outlet temperature TAO.

In the present embodiment, the controller 60 controls the operation of the pump 20 such that the flow rate of the coolant flowing through the subcooling heat exchanger 21 decreases as the flow rate of the refrigerant increases. Thus, the heat exchange amount in the subcooling heat exchanger 21 can be prevented from becoming excessive when the flow rate of the refrigerant is large.

In the present embodiment, the controller 60 controls the operation of the pump 20 such that the flow rate of the coolant flowing through the subcooling heat exchanger increases as the flow rate of the refrigerant decreases. Thus, the heat exchange amount in the subcooling heat exchanger can be prevented from becoming insufficient when the flow rate of the refrigerant is small.

In the present embodiment, the part positioned between both end parts of the tube 221, which has a planar shape with the planar surfaces 221a, is bent such that the planar surfaces face each other.

Such a tube 221 can be formed by a very easy process. Each of both end parts of the tube 221 has a perfectly circular cross-sectional shape, thus making work for connecting a coolant hose in the coolant circuit 11 to the tube 221 very simple.

In the present embodiment, the protrusions 221b are formed at the inner surface of the part positioned between both end parts of the tube 221. Thus, the surface area of the inner surface of the tube 221 can be enlarged by the protrusions 221b, thereby increasing the heat transfer area of the tube 221. The protrusions 221b serve as the support rods when the tube 221 is processed to the planar shape, thereby making it possible to prevent the tube 221 from being excessively pressed to become a defective formed product.

Second Embodiment

Figure 10:
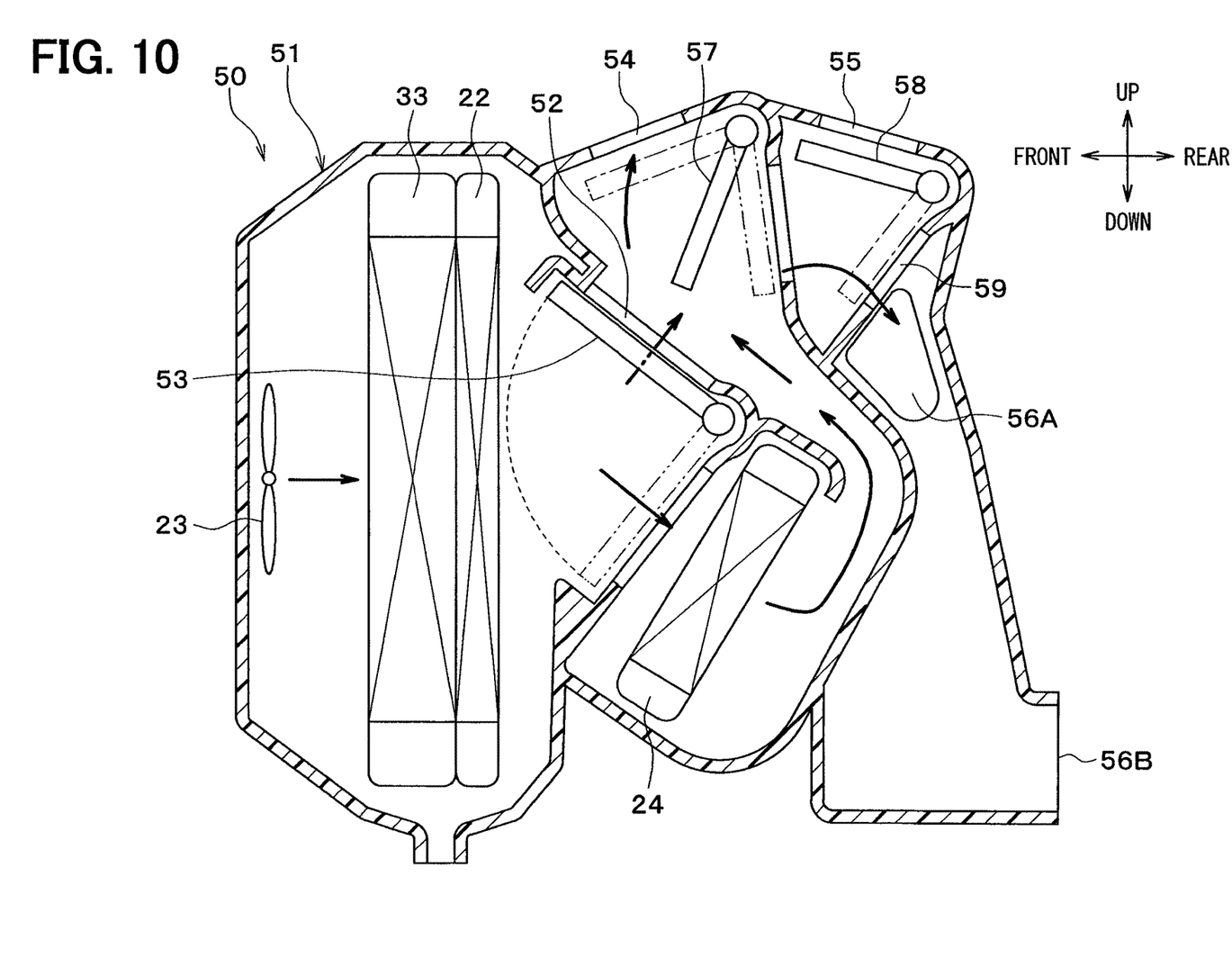
FIG. 10 is a cross-sectional view showing an interior air-conditioning unit in a second embodiment.

In the above-mentioned embodiment, the auxiliary air heater 22 is disposed between the air mix door 53 and the heater core 24 in the casing 51. However, in the present embodiment, as shown in FIG. 10, the auxiliary air heater 22 is disposed between the evaporator 33 and the air mix door 53 in the casing 51. The present embodiment can also exhibit the same operations and effects as the above-mentioned embodiment.

Third Embodiment

Figure 11:
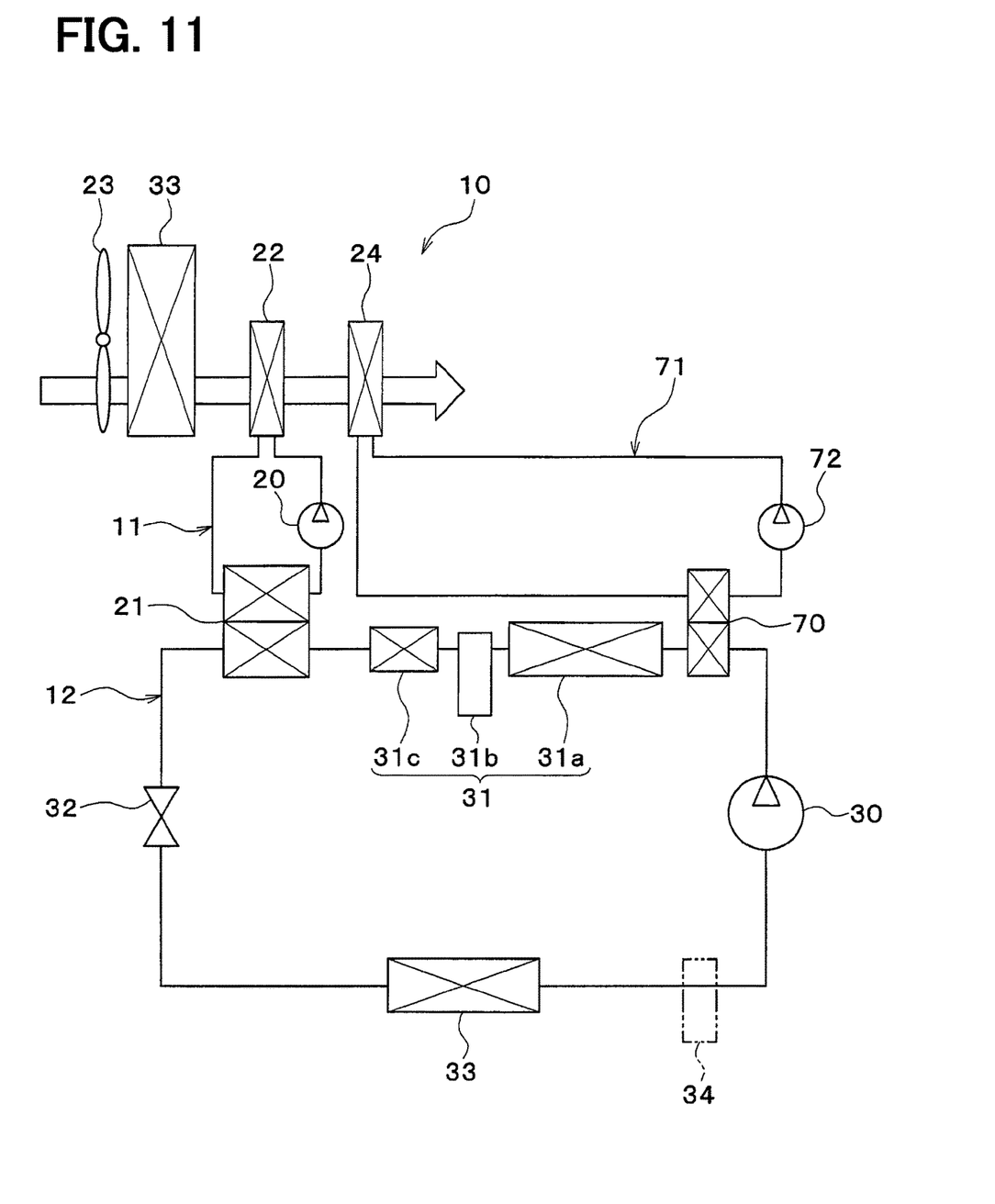
FIG. 11 is an entire configuration diagram showing an air conditioner for a vehicle in a third embodiment.

In the present embodiment, as shown in FIG. 11, in the refrigeration cycle 12, a high-pressure side heat exchanger 70 is disposed on the refrigerant discharge side of the compressor 30 and on the refrigerant inlet side of the condenser 31.

The high-pressure side heat exchanger 70 is a heat exchanger that exchanges heat between a high-pressure side refrigerant discharged from the compressor 30 and the coolant in a heater core coolant circuit 71, thereby condensing the high-pressure refrigerant.

The heater core coolant circuit 71 has a heater core pump 72. The heater core pump 72 is an electric pump that draws and discharges the coolant. The heater core pump 72 may be a belt-driven pump driven by a driving force of the engine transmitted thereto via a belt.

In the present embodiment, the heater core 24 exchanges heat between the air to be blown into the vehicle interior and a coolant heated by the high-pressure side heat exchanger 70 in the heater core coolant circuit 71 to thereby heat the air.

The present embodiment can also exhibit the same operations and effects as the above-mentioned embodiment.

Fourth Embodiment

Figure 12:
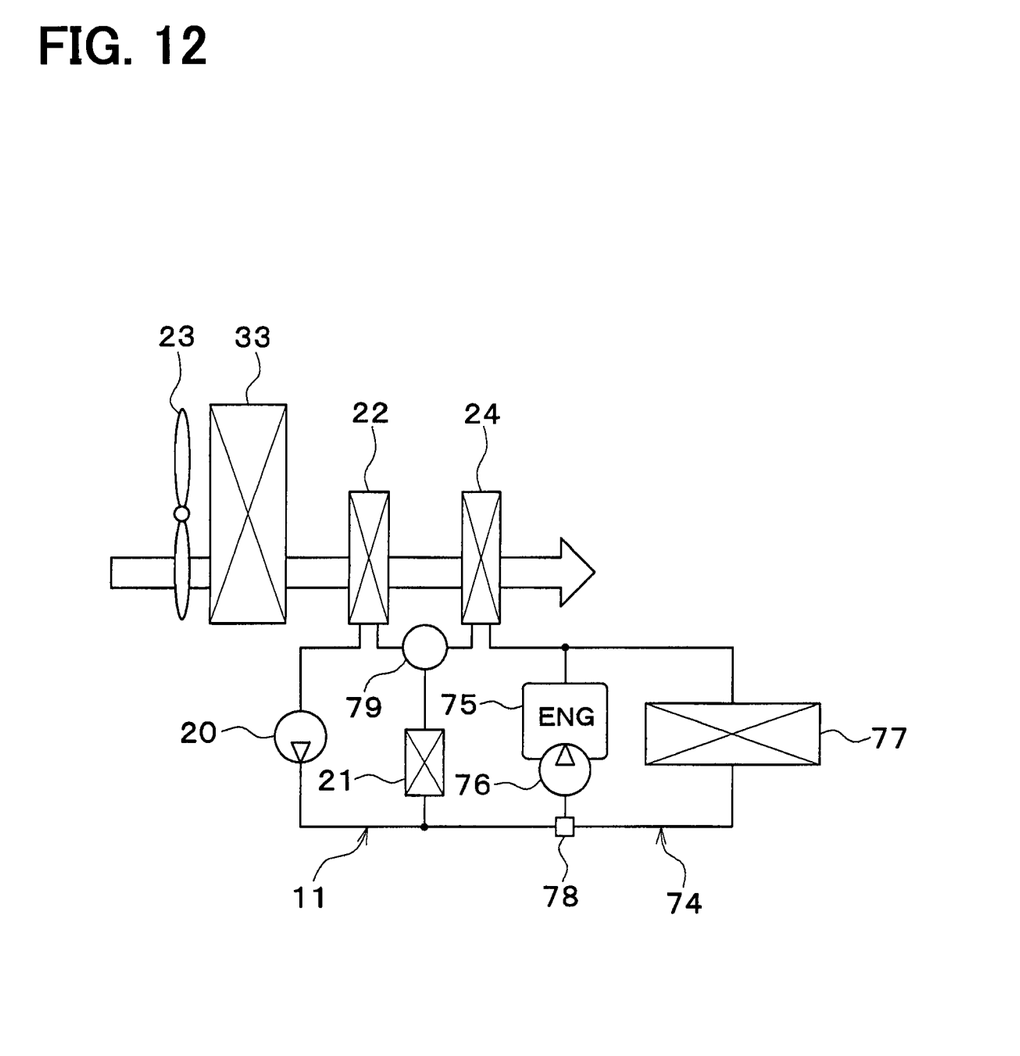
FIG. 12 is an entire configuration diagram showing an air conditioner for a vehicle in a fourth embodiment.

In the present embodiment, as shown in FIG. 12, an engine cooling circuit 74 is connectable to the coolant circuit 11.

The engine cooling circuit 74 includes an engine 75, an engine pump 76, a radiator 77, and a thermostat 78. The engine 75 is a warm-up target device that requires warm-up. The engine pump 76 is an electric pump that draws and discharges the coolant. The engine pump 76 may be a belt-driven pump that is driven by a driving force of the engine 75 transmitted thereto via a belt.

The radiator 77 is a heat exchanger that exchanges heat between the coolant and the outside air. The thermostat 78 is a coolant temperature responsive valve. The coolant temperature responsive valve is a valve that includes a mechanical system designed to open and close a coolant flow passage by displacing a valve body using a thermo wax that has its volume changeable depending on its temperature.

The engine cooling circuit 74 is connected to the coolant circuit 11 via a switching valve 79. The switching valve 79 switches between a state in which the engine cooling circuit 74 and the coolant circuit 11 are fluidly connected together and a state in which the engine cooling circuit 74 and the coolant circuit 11 are fluidly shut off from each other. The operation of the switching valve 79 is controlled by the controller 60. The switching valve 79 is an engine flow-rate adjustment portion that adjusts the flow rate of the coolant flowing through the engine 75. The switching valve 79 is a device flow-rate adjustment portion that adjusts the flow rate of the coolant flowing through the warm-up target device.

In the present embodiment, the engine 75 can be warmed up by using heat dissipated from the refrigerant in the subcooling heat exchanger 21.

An EGR cooler may be disposed in the engine cooling circuit 74. The EGR cooler is a heat exchanger that exchanges heat between the coolant and exhaust gas to be returned to the intake side of the engine, thereby cooling the exhaust gas.

In the EGR cooler, the coolant is heated by exhaust recirculation gas. Thus, the coolant heated by the EGR cooler can be used for air-heating or the like. That is, the heat of the exhaust recirculation gas can be used for air-heating or the like.

However, if the temperature of the coolant flowing into the EGR cooler is extremely low, the condensed water is generated when the exhaust recirculation gas is cooled in the EGR cooler, thus easily causing corrosion. For this reason, the coolant cannot flow into the EGR cooler until the temperature of the coolant increases to some extent. Consequently, the heat of the exhaust recirculation gas cannot be used for air-heating or the like, and additionally, the exhaust gas cannot be cooled by the coolant. Thus, the exhaust gas cannot be recirculated to the engine, thus failing to obtain the effect of improving the fuel efficiency.

That is, the EGR cooler requires the coolant flowing thereinto to have a predetermined temperature or higher. For such a device, the coolant having the predetermined temperature or higher desirably flows thereinto at an early stage. Thus, the EGR cooler is a warm-up target device that requires warm-up.

When the EGR cooler is disposed in the engine cooling circuit 74, the EGR cooler can be warmed up by using the heat dissipated from the refrigerant in the subcooling heat exchanger 21.

In the present embodiment, the controller 60 controls the operation of the switching valve 79 such that the flow rate of the coolant flowing through the warm-up target device, such as the engine 75, increases as the flow rate of the refrigerant in the refrigeration cycle 12 increases.

Thus, the warm-up capability of the refrigeration cycle 12 for the warm-up target device, such as the engine 75, can be enhanced when a large heat exchange amount can be secured in the subcooling heat exchanger 21 because of a large flow rate of the refrigerant in the refrigeration cycle 12. By enhancing the warm-up capability of the refrigeration cycle 12 for the engine 75, the fuel efficiency can be improved.

Fifth Embodiment

Figure 13:
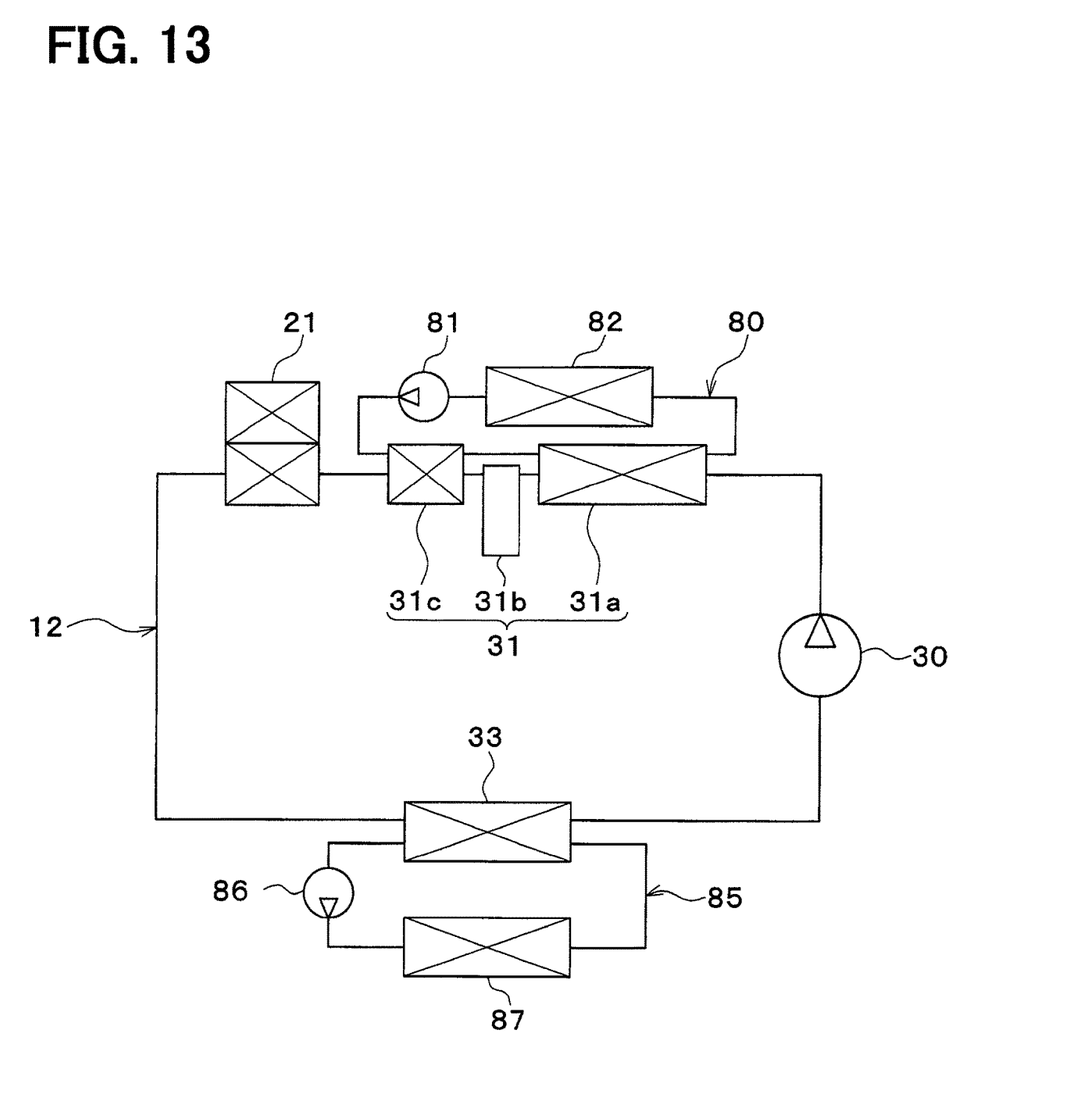
FIG. 13 is an entire configuration diagram showing an air conditioner for a vehicle in a fifth embodiment.

In the present embodiment, as shown in FIG. 13, the condenser 31 exchanges heat between the high-pressure refrigerant discharged from the compressor 30 and the coolant in a condenser coolant circuit 80. The evaporator 33 exchanges heat between the low-pressure refrigerant decompressed and expanded by the expansion valve 32 and the coolant in an evaporator coolant circuit 85.

A condenser pump 81 and a second radiator 82 are disposed in the condenser coolant circuit 80. The condenser pump 81 is an electric pump that draws and discharges the coolant. The condenser pump 81 may be a belt-driven pump that is driven by a driving force of the engine 75 transferred thereto via a belt. The second radiator 82 is a heat exchanger that exchanges heat between the coolant in the condenser coolant circuit 80 and the outside air.

Thus, the coolant circulates between the second radiator 82 and each of the condensing portion 31a and the subcooling portion 31c in the condenser 31.

An evaporator pump 86 and a cooler core 87 are disposed in the evaporator coolant circuit 85. The evaporator pump 86 is an electric pump that draws and discharges the coolant.

The evaporator pump 86 may be a belt-driven pump that is driven by a driving force of the engine 75 transferred thereto via a belt.

The cooler core 87 is a heat exchanger that exchanges heat between the coolant in the condenser coolant circuit 80 and the air to be blown into the vehicle interior. In the present embodiment, instead of the evaporator 33, the cooler core 87 is accommodated in the casing 51 of the interior air-conditioning unit 50.

The present embodiment can also exhibit the same operations and effects as the above-mentioned embodiment.

OTHER EMBODIMENTS

The above-mentioned embodiments can be combined together as appropriate. Various modifications and changes can be made to the above-mentioned embodiments, for example, in the following way.

(1) Although in the above-mentioned respective embodiments, cooling water is used as the coolant circulating in the coolant circuit 11, various kinds of heat mediums, such as oil, may be used as the coolant.

A nanofluid may be used as the coolant. The nanofluid is a fluid that has nanoparticles mixed therein, each nanoparticle having a diameter of the order of nanometer. By mixing the nanoparticles into the coolant, the following functions and effects can be obtained, in addition to the function and effect of decreasing a freezing point, like a coolant using ethylene glycol (so-called antifreezing fluid).

That is, the mixture of the nanoparticles in the coolant can exhibit the functions and effects of improving the thermal conductivity in a specific temperature range, increasing the thermal capacity of the coolant, preventing the corrosion of metal pipes and the degradation of rubber pipes, and enhancing the fluidity of the coolant at an ultralow temperature.

These functions and effects are varied depending on the configuration, shape, and blending ratio of the nanoparticles, and additive material thereto.

Thus, the thermal conductivity can be improved, so that even when being used in a small amount, the heat medium can achieve the equivalent cooling efficiency, as compared to the coolant using ethylene glycol.

Further, the thermal capacity of the heat medium can be increased, so that a cold storage amount of the heat medium itself can be increased. The cold storage amount of the heat medium itself is an amount of cold heat stored due to sensible heat.

By increasing the cold storage amount, the temperature adjustment through cooling or heating of the device can be performed using the cold storage heat for some periods of time to save the power of the vehicle air conditioner 10, even though the compressor 30 is not operated.

An aspect ratio of the nanoparticle is preferably 50 or more. This is because such an aspect ratio can achieve adequate thermal conductivity. The aspect ratio of the nanoparticle is a shape index indicating the ratio of the width to the height of the nanoparticle.

Nanoparticles suitable for use include any one of Au, Ag, Cu, and C. Specifically, examples of usable constituent atoms of the nanoparticles include Au nanoparticles, a Ag nanowire, a carbon nanotube (so-called CNT), a graphene, graphite core-shell nanoparticles, a Au nanoparticle-containing CNT, and the like. The graphite core-shell nanoparticle is a particle body having a structure enclosing the above-mentioned atom, such as a carbon nanotube.

(2) In the refrigeration cycle 12 of each of the above-mentioned embodiments, fluorocarbon refrigerant is used as the refrigerant. However, the kind of refrigerant is not limited thereto, and may be natural refrigerant, such as carbon dioxide, a hydrocarbon-based refrigerant, or the like.

(3) The refrigeration cycle 12 in each of the above-mentioned embodiments configures a subcritical refrigeration cycle in which a high-pressure side refrigerant pressure does not exceed the critical pressure of the refrigerant, but may configure a super-critical refrigeration cycle in which a high-pressure side refrigerant pressure exceeds the critical pressure of the refrigerant.

(4) Although each of the above-mentioned embodiments has described the vehicle air conditioner 10, the air conditioners in the embodiments are not limited thereto. For example, the air conditioners described in the above embodiments can be modified to stationary air conditioners.

What is claimed is:

1. An air conditioner comprising:
a refrigeration cycle including a compressor that draws and discharges a refrigerant, a high-pressure side heat exchanger that dissipates heat from the refrigerant discharged from the compressor, and a subcooling heat exchanger that exchanges heat between the refrigerant having heat-dissipated in the high-pressure side heat exchanger and a heat medium in a heat medium circuit to subcool the refrigerant having heat-dissipated in the high-pressure side heat exchanger;
an air-conditioning casing defining an air passage through which air to be blown into a space to be air-conditioned flows;
a blower configured to blow the air to the air passage;
an air cooler disposed in the air passage to cool the air;
an air heater disposed on an air flow downstream side of the air cooler in the air passage, to heat the air cooled by the air cooler by exchanging heat between the air and an engine coolant for cooling an engine;
an auxiliary air heater disposed on the air flow downstream side of the air cooler and on an air flow upstream side of the air heater in the air passage, to heat the air cooled by the air cooler by exchanging heat with the heat medium;
a flow-rate adjustment portion configured to adjust a flow rate of the heat medium circulating between the subcooling heat exchanger and the auxiliary air heater; and
a controller configured to control an operation of the flow-rate adjustment portion, such that the flow rate of the heat medium flowing through the auxiliary air heater increases as an amount of heat required for heating the air cooled by the air cooler increases, and the flow rate of the heat medium flowing through the auxiliary air heater decreases as an amount of heat required for heating the air cooled by the air cooler decreases.

2. The air conditioner according to claim 1, wherein the controller is configured to control an operation of the flow-rate adjustment portion such that the flow rate of the heat medium flowing through the subcooling heat exchanger decreases as a flow rate of the refrigerant increases.

3. The air conditioner according to claim 1, wherein the controller is configured to control an operation of the flow-rate adjustment portion such that the flow rate of the heat medium flowing through the subcooling heat exchanger increases as a flow rate of the refrigerant decreases.

4. The air conditioner according to claim 1, further comprising:

a device flow-rate adjustment portion configured to adjust the flow rate of the heat medium flowing from the subcooling heat exchanger to a warm-up target device that requires warm-up; and the controller is configured to control an operation of the device flow-rate adjustment portion such that the flow rate of the heat medium flowing through the warm-up target device increases as a flow rate of the refrigerant increases.

5. The air conditioner according to claim 4, wherein the device flow-rate adjustment portion is a device flow-rate adjustment valve.

6. The air conditioner according to claim 4, wherein the warm-up target device is the engine.

7. The air conditioner according to claim 1, further comprising:

an engine flow-rate adjustment portion configured to adjust the flow rate of the heat medium flowing from the subcooling heat exchanger to the engine; and the controller is configured to control an operation of the engine flow-rate adjustment portion such that the flow rate of the heat medium flowing through the engine increases as a flow rate of the refrigerant increases.

8. The air conditioner according to claim 7, wherein the engine flow-rate adjustment portion is an engine flow-rate adjustment valve.

9. The air conditioner according to claim 1, wherein the auxiliary air heater has a tube in which the heat medium flows, and a part positioned between two end parts of the tube, which has a shape with surfaces, is bent such that the surfaces face each other.

10. The air conditioner according to claim 9, wherein an inner surface of the part positioned between the two end parts of the tube is provided with a protrusion.

11. The air conditioner according to claim 1, wherein the flow-rate adjustment portion is a flow pump.

12. An air conditioner comprising:

a refrigeration cycle including a compressor that draws and discharges a refrigerant, a high-pressure side heat exchanger that dissipates heat from the refrigerant discharged from the compressor, and a subcooling heat exchanger that exchanges heat between the refrigerant having heat-dissipated in the high-pressure side heat exchanger and a heat medium to subcool the refrigerant having heat-dissipated in the high-pressure side heat exchanger;

an air-conditioning casing defining an air passage through which air to be blown into a space to be air-conditioned flows;

a blower configured to blow the air to the air passage;

an air cooler disposed in the air passage to cool the air;

an air heater disposed on an air flow downstream side of the air cooler in the air passage, to heat the air cooled by the air cooler;

an auxiliary air heater disposed on the air flow downstream side of the air cooler and on an air flow upstream side of the air heater in the air passage, to heat the air cooled by the air cooler by exchanging heat with the heat medium;

a flow-rate adjustment portion configured to adjust a flow rate of the heat medium circulating between the subcooling heat exchanger and the auxiliary air heater; and a controller configured to control an operation of the flow-rate adjustment portion, such that the flow rate of the heat medium flowing through the subcooling heat exchanger decreases as a flow rate of the refrigerant increases, and the flow rate of the heat medium flowing through the subcooling heat exchanger increases as the flow rate of the refrigerant decreases.

13. The air conditioner according to claim 12, wherein the flow-rate adjustment portion is a flow pump.

14. An air conditioner comprising:

a refrigeration cycle including a compressor that draws and discharges a refrigerant, a high-pressure side heat exchanger that dissipates heat from the refrigerant discharged from the compressor, and a subcooling heat exchanger that exchanges heat between the refrigerant having heat-dissipated in the high-pressure side heat exchanger and a heat medium to subcool the refrigerant having heat-dissipated in the high-pressure side heat exchanger;

an air-conditioning casing defining an air passage through which air to be blown into a space to be air-conditioned flows;

a blower configured to blow the air to the air passage;

an air cooler disposed in the air passage to cool the air;

an air heater disposed on an air flow downstream side of the air cooler in the air passage, to heat the air cooled by the air cooler;

an auxiliary air heater disposed on the air flow downstream side of the air cooler and on an air flow upstream side of the air heater in the air passage, to heat the air cooled by the air cooler by exchanging heat with the heat medium;

a flow pump configured to adjust a flow rate of the heat medium circulating between the subcooling heat exchanger and the auxiliary air heater;

a device flow-rate adjustment valve configured to adjust the flow rate of the heat medium flowing from the subcooling heat exchanger to a warm-up target device that requires warm-up; and a controller configured to control an operation of the device flow-rate adjustment valve such that the flow rate of the heat medium flowing through the warm-up target device increases as a flow rate of the refrigerant increases.

15. An air conditioner comprising:

a refrigeration cycle including a compressor that draws and discharges a refrigerant, a high-pressure side heat exchanger that dissipates heat from the refrigerant discharged from the compressor, and a subcooling heat exchanger that exchanges heat between the refrigerant having heat-dissipated in the high-pressure side heat exchanger and a heat medium to subcool the refrigerant having heat-dissipated in the high-pressure side heat exchanger;

an air-conditioning casing defining an air passage through which air to be blown into a space to be air-conditioned flows;

a blower configured to blow the air to the air passage;

an air cooler disposed in the air passage to cool the air;

an air heater disposed on an air flow downstream side of the air cooler in the air passage, to heat the air cooled by the air cooler;

an auxiliary air heater disposed on the air flow downstream side of the air cooler and on an air flow upstream side of the air heater in the air passage, to heat the air cooled by the air cooler by exchanging heat with the heat medium;

a flow pump configured to adjust a flow rate of the heat medium circulating between the subcooling heat exchanger and the auxiliary air heater;

an engine flow-rate adjustment valve configured to adjust the flow rate of the heat medium flowing from the subcooling heat exchanger to an engine; and a controller configured to control an operation of the engine flow-rate adjustment valve such that the flow rate of the heat medium flowing through the engine increases as a flow rate of the refrigerant increases.

16. The air conditioner according to claim 14, wherein the warm-up target device is an engine.

* * * * *